UNITED STATES PATENT OFFICE.

HUGO R. MOSNAT, OF KANSAS CITY, MISSOURI.

COMPOSITION OF MATTER FOR TREATING LEATHER.

1,277,242.    Specification of Letters Patent.    Patented Aug. 27, 1918.

No Drawing.    Application filed December 26, 1917. Serial No. 208,849.

*To all whom it may concern:*

Be it known that I, HUGO R. MOSNAT, citizen of the United States, residing at Kansas City, in the county of Jackson and State of Missouri, have invented certain new and useful Improvements in Composition of Matter for Treating Leather; and I do declare the following to be a full, clear, and exact description of the invention, such as will enable others skilled in the art to which it appertains to make and use the same.

My invention relates to a composition of matter for water proofing and preserving leather, particularly shoe soles, the principal object of the invention being to extend the life of the soles and to protect the foot of the wearer of the shoe upon which a treated sole is used.

It is also an object of the invention to provide a composition of matter which may be applied easily and quickly to stock leather or to shoe soles.

In accomplishing these objects I have provided the composition of matter hereinafter described and claimed and which in general consist of the following ingredients in substantially the proportions named.

4 pounds gum copal, second quality,
4 pounds rosin "A" quality,
2½ gallons turpentine (turps),
¼ pound acetate of lead (dried sugar of lead),
¼ pound sulfate of iron (dried copperas),
½ pound lead monoxid (litharge),
¼ pound plumbago (graphite),
2 pounds asphaltum,
¼ pound oil of mirbane.

The functions of the several ingredients are as follows:

Both the gum copal and rosin are used to fill the pores or interstices of the leather to prevent the passage of water therethrough. While the gum copal might be used alone, it is of such composition that it requires considerable time to dry and would therefore delay the use of the leather or shoes to which it is applied. The rosin is not adapted for use alone, however, as while it would seal the interstices, it would make the leather too brittle for ordinary purposes. I therefore prefer to use both ingredients in substantially the same proportions by weight.

The turpentine is used as a solvent or vehicle for the other ingredients and further helps to quickly dry the gum.

Each of the three ingredients, acetate of lead, sulfate of iron and lead monoxid is used because of its drying properties and the combination of the three has been found to be more effective than either taken alone.

The plumbago and asphaltum, being respectively greasy and oily, are used to facilitate the application of the composition to the leather and, both being black, serve as coloring ingredients to provide an attractive surface to the leather after the composition has been applied thereto, the asphaltum further serving as a preserving of the leather. The oil of mirbane serves not only as a preservative but also gives the leather a final gloss or finish.

In preparing the composition, I break the gum copal and rosin to about the size of walnuts and dissolve the same in the turpentine, which has been previously heated to about boiling temperature. While the gum and turpentine is still hot, I add the other ingredients, except the oil of mirbane, and mix thoroughly. The mass is then allowed to cool and the oil of mirbane added when it is thoroughly cool. The finished mass then constitutes a liquid which may be bottled, canned or contained in any suitable manner and which may be applied to leather by brush, dauber or rag, by painting it on the leather. The composition does not need to be rubbed into the leather as it penetrates by mere application. After the composition has been applied to the leather, either in stock or soles, it should be dried for several hours before using.

Having thus described my invention what I claim as new therein and desire to secure by Letters Patent, is:

1. A composition of matter for water proofing and preparing leather consisting of a gum, turpentine, acetate of lead, sulfate of iron and lead monoxid, plumbago and asphaltum and oil of mirbane.

2. A composition of matter for water proofing and preserving leather consisting of the following ingredients in substantially the proportions named:

4 pounds gum copal, second quality,
4 pounds rosin "A" quality,
2½ gallons turpentine (turps),
¼ pound acetate of lead (dried sugar of lead),
¼ pound sulfate of iron (dried copperas),
½ pound lead monoxid (litharge),
¼ pound plumbago (graphite),
2 pounds asphaltum,
¼ pound oil of mirbane.

In testimony whereof I affix my signature.

HUGO R. MOSNAT.

Copies of this patent may be obtained for five cents each, by addressing the "Commissioner of Patents, Washington, D. C."